US007694340B2

(12) United States Patent
Raman et al.

(10) Patent No.: US 7,694,340 B2
(45) Date of Patent: Apr. 6, 2010

(54) ANTI VIRUS FOR AN ITEM STORE

(75) Inventors: Balan Sethu Raman, Redmond, WA (US); Sameet Harishanker Agarwal, Redmond, WA (US); Nigel R Ellis, Redmond, WA (US); Sanjay Anand, Sammamish, WA (US); Rohan Kumar, Redmond, WA (US); Johannes Klein, Sammamish, WA (US); Mihai Costea, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1382 days.

(21) Appl. No.: 10/959,383

(22) Filed: Oct. 6, 2004

(65) Prior Publication Data

US 2005/0283603 A1 Dec. 22, 2005

Related U.S. Application Data

(60) Provisional application No. 60/581,569, filed on Jun. 21, 2004, provisional application No. 60/581,896, filed on Jun. 22, 2004.

(51) Int. Cl.
*G06F 11/00* (2006.01)
*G06F 7/04* (2006.01)
*G06F 13/00* (2006.01)

(52) U.S. Cl. ............................ 726/24; 726/22; 726/23

(58) Field of Classification Search ............... 726/24
See application file for complete search history.

(56) References Cited

U.S. PATENT DOCUMENTS 5,960,420 A 9/1999 Leymann

| 6,016,546 | A | 1/2000 | Kephart et al. |
| 6,275,937 | B1 | 8/2001 | Hailpern et al. |
| 6,338,141 | B1* | 1/2002 | Wells ........................ 726/24 |
| 6,678,822 | B1 | 1/2004 | Morar et al. |
| 6,721,721 | B1 | 4/2004 | Bates et al. |
| 2003/0105973 | A1* | 6/2003 | Liang et al. ................ 713/200 |

FOREIGN PATENT DOCUMENTS

GB    2 396 227 A    6/2004

(Continued)

OTHER PUBLICATIONS

Yanfang Ye, Dingding Wang, Tao Li, Dongyi Ye, "IMDS: intelligent malware detection system", Aug. 2007, KDD '07: Proceedings of the 13th ACM SIGKDD international conference on Knowledge discovery and data mining, Publisher: ACM, pp. 1043-1047.*

(Continued)

*Primary Examiner*—Matthew B Smithers
*Assistant Examiner*—Courtney D Fields
(74) *Attorney, Agent, or Firm*—Workman Nydegger

(57) ABSTRACT

Systems and methodologies for integration of an anti virus AV Plug In(s) as part of an Item Store. The semantics for operation of the AV Plug In(s) are provided by the relational Item Store, via employing a metadata component and a scanning component associated with the Item Store. The metadata component can supply a signature value being associated with the Item Store that can represent the time of scanning of data, and outcome for every scanned item. The scanning component can provide for a queuing of items in the data store in a synchronous and/or asynchronous mode for both scanning and cleaning by the AV Plug In supplied by vendors.

28 Claims, 10 Drawing Sheets

FOREIGN PATENT DOCUMENTS

| | | |
|---|---|---|
| WO | 98-10342 | 3/1998 |
| WO | WO 01/73523 A2 | 10/2001 |
| WO | WO 2007131105 A2 * | 11/2007 |

OTHER PUBLICATIONS

C. Wang, et al. On Computer Viral Infection and the Effect of Immunization. IEEE Annual Computer Security Applications Conference, 2000. 11 pages.

M. Swimmer, B. Le Charlier, and A. Mounji. Dynamic Detection and Classification of Computer Viruses Using Behavior Patterns. Proceedings of the 1995 Virus Bulletin Conference. 1995. 22 pages.

European Search Report dated Dec. 19, 2005, mailed Dec. 30, 2005, for European Patent Application Serial No. EP 05 10 5390, 3 Pages.

OA dated Feb. 27, 2009 for CN Application Serial No. 2005100823527, 4 pages.

* cited by examiner

| TABLE ITEM | | | |
|---|---|---|---|
| ITEM ID | ITEM UDT | LAST VIRUS SIGNATURE SCAN | SCAN STATE |
| 55 | - | 0 | SUSPECT |

Fig. 4a

| TABLE ITEM | | | |
|---|---|---|---|
| ITEM ID | ITEM UDT | LAST VIRUS SIGNATURE SCAN | SCAN STATE |
| 55 | - | 10001 | CLEAN |

Fig. 4b

| TABLE ITEM | | | |
|---|---|---|---|
| ITEM ID | ITEM UDT | LAST VIRUS SIGNATURE SCAN | SCAN STATE |
| 55 | - | 10001 | SUSPECT |

Fig. 4c

| TABLE ITEM | | | |
|---|---|---|---|
| ITEM ID | ITEM UDT | LAST VIRUS SIGNATURE SCAN | SCAN STATE |
| 55 | - | 10001 | CLEAN |

Fig. 4d

| TABLE ITEM | | | |
|---|---|---|---|
| ITEM ID | ITEM UDT | LAST VIRUS SIGNATURE SCAN | SCAN STATE |
| 66 | - | 10001 | INFECTED |

Fig. 4e

ANTI VIRUS FOR AN ITEM STORE

CROSS REFERENCE TO RELATED APPLICATIONS

This application claims priority to provisional application Ser. No. 60/581,569 filed on Jun. 21, 2004, entitled ANTI VIRUS FOR AN ITEM STORE, and provisional application Ser. No. 60/581,896 filed on Jun. 22, 2004 entitled ANTI VIRUS FOR AN ITEM STORE. The entireties of these applications are incorporated herein by reference.

TECHNICAL FIELD

The subject invention relates generally to anti virus protection, and more particularly to systems and methods that facilitate integration of anti virus Plug In(s) within an Item Store environment, wherein Items can be described in terms of links and attributes.

BACKGROUND OF THE INVENTION

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. As such, much business data is stored in data stores, under a management system.

Moreover, the amount of available electronic data is continuously growing, and it has become ever increasingly important to store such data in data stores in a manageable manner, which facilitates user friendly, and quick data searches and retrieval. In general, a typical data store can be referred to as an organized collection of information with data structured such that a computer program, for example, can quickly search and select desired pieces of data.

Data within a data store can be organized via one or more tables, wherein respective tables comprise a set of records, and a record can comprise a set of fields. Records are commonly indexed as rows within a table and the record fields are commonly indexed as columns such that a row/column pair of indices can reference a particular datum within a table. Typically, such data stores can be viewed as organized collection of related information stored as "records" having "fields" of information therein. As an example, a data store of finances may have a record for financial transactions such as accounts receivables, amount owed, customer information and the like. Between the actual physical data store itself (i.e., the data actually stored on a storage device) and the users of the system, the management or operating system can typically provide a software cushion or layer. As such, the data store can shield users from concerns about the underlying hardware-level details. Generally, all requests from users for access to the data are processed by the system manager. For example, information can be added or removed from data files, information retrieved from or updated in such files, and the like, all without user knowledge of underlying system implementation.

At the same time, conventional data stores and operating systems have typically relied on multiple incompatible storage for data, including; the registry, event log messages, contact information, and e-mail, or simply have used multiple flat files for data such as images and audio. For example, in conventional data stores stored contents are in general treated as separate entities, even though they are interrelated at some level. Accordingly, when a large number of items exist, it can become important to have a flexible and efficient mechanism to search for particular items based on their properties and content. For example, it can be desirable for knowledge workers to be able to search for contents independent of format—regardless of what type of a file a particular content is and what application created that.

Given a new file system that operates based on relational objects, new challenges can arise. For example, there can be new ways that a virus can store itself in such file system. Typically, conventional virus checking are limited to performing virus checks for files that are stored generally in the same computers upon which anti virus programs are executing. Accordingly, while specific entities, including end users and web sites, can to an extent be capable of performing virus checking on files stored locally on their computers, oftentimes those entities are not capable of determining the viral risks associated with files under the control of other entities, wherein malicious codes can employ encoded strings being deposited in the store that will get decoded in the client space and propagate through email. Thus, for a conventional file system, a virus can be resident in one or more streams of the file, and nonetheless such is simply one file.

On the other hand, in relational Item Stores, content can be persisted in an item, wherein an item can include a plurality of properties, with each property associated with various other items. Thus, saving to the Item Store and reading back from the store can include results that can be aggregated over many properties of many items. This can create a different paradigm; such as creating an update path or read path with many properties. Viruses can employ such arrangement for hiding themselves in "piece meals", for example, a virus can store an encrypted body 'X' in the property of an object, and propagate by querying the store and decoding the encrypted property on the client, such as a metadata for an image that can appear innocent to an anti virus programs.

By distributing the body of the virus over multiple properties and multiple items the Item Store can become a virus store. Put differently, a virus can be stored in pieces and may write itself into the properties of multiple items, with a naïve query aggregating such pieces and leading to execution of the virus. Accordingly, a conventional filter model to intervene in the update or read path is in general no longer appropriate for such relational Item Store arrangements.

Therefore, there is a need to overcome the aforementioned deficiencies associated with conventional systems and methodologies related to Item Store operations.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of building expectations and semantics of an anti virus (AV) Plug In(s), into a relational Item Store by employing a metadata component and a scanning component associated with the Item Store. Such a metadata component can provide for a rule set and/or logic within the Item Store to direct the anti-virus Plug In as to, when to scan the contents, how to scan, when to invalidate, and the like. The metadata component can also supply a signature value assigned to the Item Store, which can represent the time of scanning of data, with space designated (e.g., designated columns) in the relational Item Store to identify the out come of such scanning (e.g., clean outcome, suspect outcome, infected out come, unnecessary to scan, and the like). An Application Program Interface (API) can be provided to call upon the Plug In as required, to update the signatures and set a new signature value. In addition, various scanning behaviors can be introduced to balance the speed/accuracy in which items can be supplied to a user as a result of a query, versus the risk of such results not being totally scanned. For example, a user can be willing to sacrifice accuracy (e.g., accept incomplete results in response to a query), for obtaining the advantage of having all such contents contributing to the results totally scanned.

Moreover, further rule sets in the Item Store can establish links between items, wherein the rule set can further allow for links to be defined and provide the information necessary to parse through the data structure to determine the links of text to elements. A schema can be employed to provide the necessary rule set and supply the necessary information. For example, a document object model can be provided to represent components of related entities for in-memory representations. In addition, the scanning component can provide for a queuing of items in the data store in a synchronous and/or asynchronous mode for both scanning and cleaning by the AV Plug-In.

In accordance with one aspect of the subject invention, to provide backward compatibility of the Item Store (and its AV Plug Ins) with traditional files (e.g., data stream files and applications) an arrangement of a filter drivers stacked upon a Multiple Universal Naming Convention Provider (MUP) can be provided—(The Universal Naming Convention (UNC) can supply a naming convention for files that provides a machine-independent means of locating the file.) Such direct layering of filter components over the MUP provides for a file system component that services I/O requests for the UNC namespace. Thus, the same visibility for contents available to the Item Store can be provided for the AV Plug In.

In a related aspect of the subject invention, a set of interfaces can be provided as part of the interaction of the AV Plug In with the relational Item Store engine. Such interfaces can, for example, be in a form of a series of stubs and/or place holders for routines that can be developed by the vendors to link the supplied AV Plug In with the relational Item Store.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIGS. 4a-4e depict various stages of creation, and scanning of rows in accordance to an exemplary aspect of the subject invention.

DETAILED DESCRIPTION OF THE INVENTION

Figure 1:
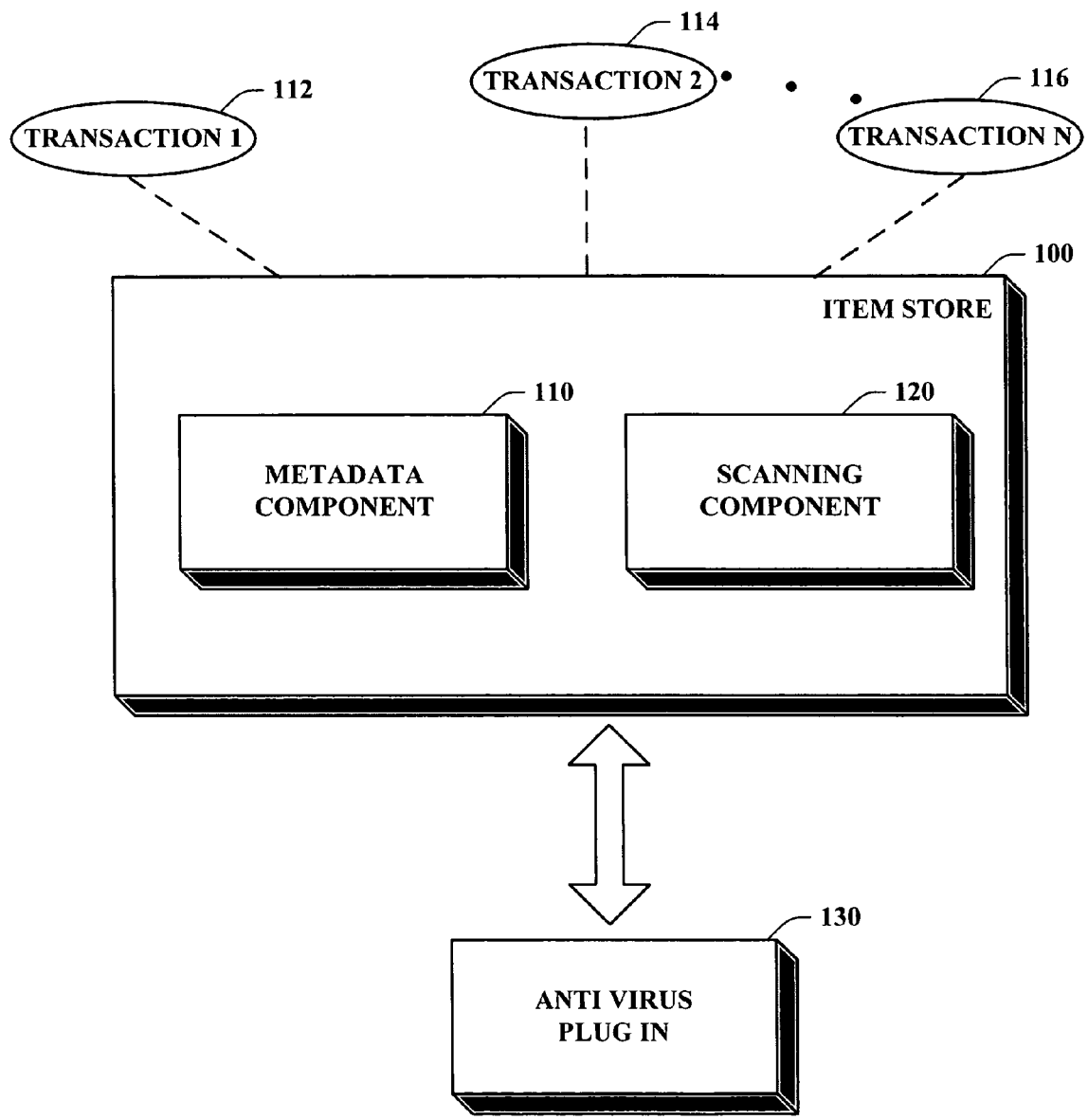
FIG. 1 illustrates a block diagram of a relational Item Store that employs an anti virus (AV) Plug In, in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Referring initially to FIG. 1, a block diagram of a relational Item Store 100 that interacts with an anti virus (AV) Plug In 130, in accordance with an aspect of the subject invention is illustrated. Typically, the data Item Store 100 can be a relational data base, which employs three features, namely, items, links and attributes. An item can represent any 'thing' that a user, such as a client, wishes to represent as an item, and can be uniquely identified by an item ID. A link provides a named, directed relationship between two items. An attribute associates a labeled value with an item. Items are described in terms of links and attributes. Links represent item associations and attributes represent other information about items.

Moreover, in such a relational data store environment data can be stored as rows in one or more tables. The data store can be accessed by one or a plurality of queries in form transactions $T_1$ thru $T_N$ (N being an integer). Such transactions can, for example, include row level manipulation of data in the data Item Store 100. The transactions 112, 114, 116 can have access to the data store based on level of discriminatory access granted thereto by the data store (e.g., read only access, read/write access, and the like) to that data is of significant importance.

The Item Store 100 of the subject invention can include a metadata component 110, and a scanning component 120. The metadata component 110 can provide for a rule set and/or logic within the data store 110 to direct operation of the antivirus Plug In 130. The metadata component 110 can provide semantics for the AV Plug In 130, such as, when to scan, how to scan, when to invalidate, and the like.

Moreover, the metadata component 110 can provide a designation for an acceptable bar level for a status of current viruses that are known at a time a virus scan is performed on the data store 100. For example, the acceptable bar level can be designated by a time stamp, wherein the store can be assigned a global AV signature time stamp, with a value assigned to "VIRUSSIGNATURETS".

An exemplary Data Definition Language (DDL) for initiating an Application Program Interface (API) to call upon the Plug In to update the signatures and set a new signature value can include:

GetNewVirusSignature( )
GetCurrentVirusSignature( )

In accordance with an aspect of the subject invention, the rows associated with the tables of the data store 100 can include two columns to define two properties namely; "Last Virus Signature Scan", and a "Scan State", as will be described in more detail infra. Briefly, the "last Virus Signature Scan" represents a time stamp stored per row on which a last anti virus scan (AV) was completed on the row, and the "Scan State" represents whether the row contents are "clean", "suspect", or "infected". When a row is created, the system automatically sets the value of "Last Virus Signature Scan" to zero, and the state of the row content to "suspect". An Application Program Interface (API) can be provided to call upon the anti virus Plug In 130, which is employed to scan the data store 100 as required, and to update the signatures and set a new signature value. Accordingly, the metadata component can supply a signature value being associated with the Item Store 100 that can represent the time of scanning of data, with space designated in the relational store to identify the out come of such scanning (e.g., clean outcome, suspect outcome, infected out come). It is to be appreciated that while employing the anti virus check can be a default of the system, a metadata component of "unnecessary to check" can also be designated, when a user chooses not to scan specified items.

The Item Store 100 can further include a scanning component 120 that employs the Plug In 130 in a reliable fashion. The scanning component can provide for a queuing of items (e.g., recent updates, changes, and the like) in the Item Store in a synchronous and/or asynchronous mode for both scanning and cleaning by the AV Plug In, which is supplied by third party vendors.

Figure 2:
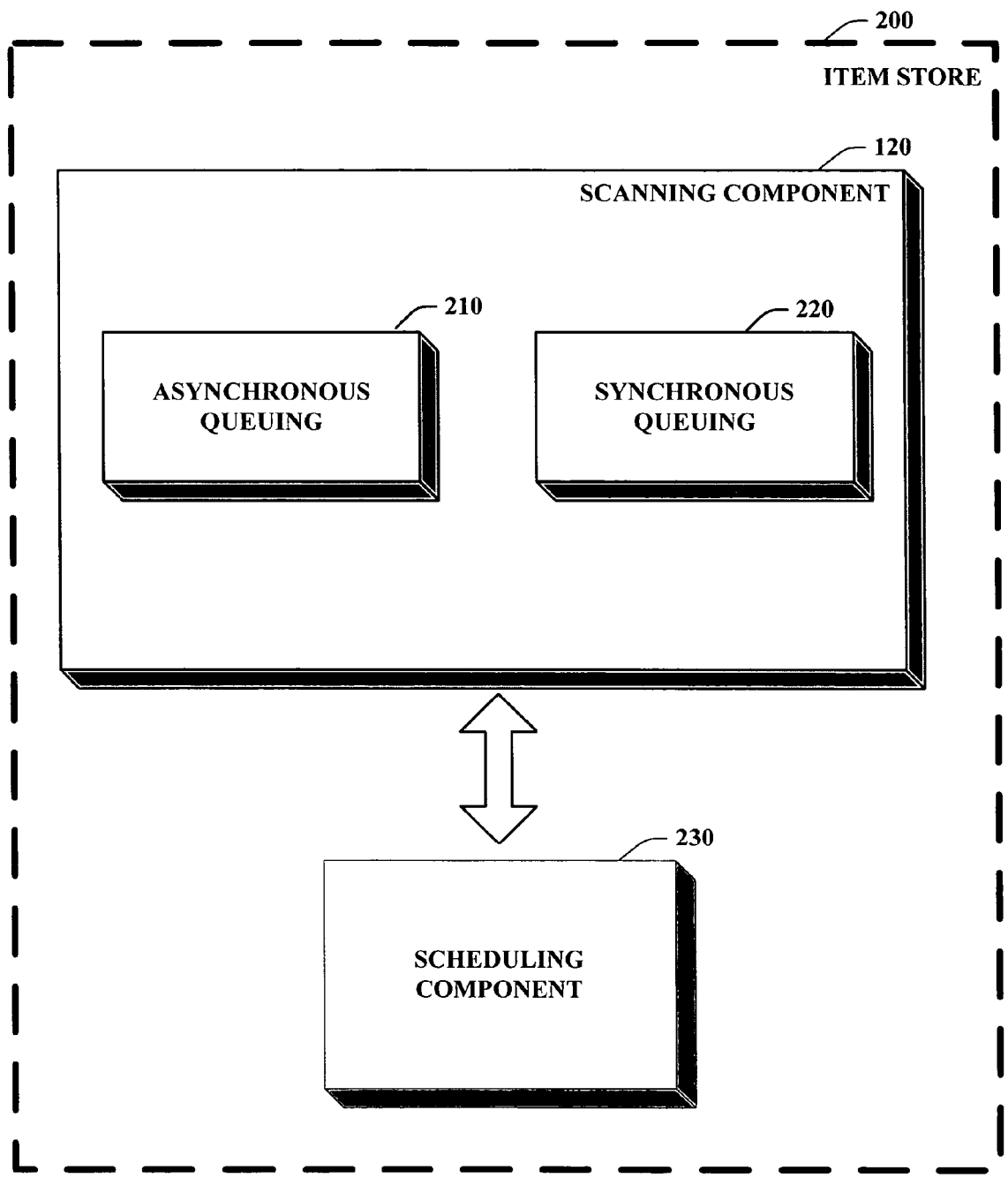
FIG. 2 is a block diagram of a scanning component in accordance with an aspect of the subject invention.

Referring now to FIG. 2, a block diagram illustrates the scanning component 120 to further include an asynchronous queuing component 210 (Back ground Scan), and a synchronous queuing component 220 (On-access Scan). In general, AV Plug Ins cannot detect a new piecemeal virus upon entry to the Item Store. Thus, the AV Plug Ins can be enabled to analyze the total content of the Item Store 200. Accordingly, the AV Plug Ins are not constrained to a particular domain of the Item Store 200, even though a user can be connected to such particular domain. In addition, the Item Store 200 can further employ a scheduling component 230 that queues Item Store content for scanning by the AV Plug In. It is to be appreciated that the scheduling component 230 can also be part of the scanning component 120, even though FIG. 2 illustrates it as a separate component. Such component can queue/de-queue contents, call the AV Plug In, and based on the results update the metadata component.

Typically, the Item Store 200 can employ the asynchronous queuing component 210 for a "Back ground Scan" queue by automatically en-queuing new or updated items for virus scan or virus cleaning. Items in a queue can be de-queued by the Item Store 200, for example by the scheduling component 230, and an appropriate AV interface can be called synchronously.

The schedule of unscanned items for processing by the AV Plug In can be provided in "ItemHasVirus" API. Such calls may be returned synchronously, and the Item Store 200 can update the associated AV metadata component in the Item Store based on the Boolean result of this call. For example, if the interface returns a value of "TRUE", the object can be designated to contain a virus, and the AV status for the row is updated to:

lastVirusSignatureScanTS=@@VIRUSSIGNATURETS AND scanState="infected".

Also, should the interface return a value of "FALSE", the object is found to be virus free. Accordingly, the AV status for the row can be updated to lastVirusSignatureScanTS=@@VIRUSSIGNATURETS and scanState="clean".

Referring now to the synchronous queuing component 220 (On-access Scan) within the store, such component can be employed such that whenever a read is performed on the Item Store, it is typically assured that the result will typically only contain items which has a scanState of "clean". Thus, Synchronous AV on the read path can typically guarantee that the client can receive most current result set, unless a real virus is detected while processing the query. Nonetheless, scenarios can exist wherein a high price can be paid for such assurance. For example, a first user deposits a plurality of new photos in an Item Domain, wherein a second user is searching for Word Documents. The second user can now be asked to wait while the query side effects scan of first user's photo deposit.

At the same time, every time a query is performed results can be incomplete if the range of items that query is performed is not fully AV scanned. Accordingly, the subject invention introduces a "forced" scanning as part of the synchronous queuing component, based on setting a "session variable", the manner an application ought to behave is determined. The application can either rely on an optimistic approach and accept the result of the transaction—even though incomplete, because the AV Plug In has not been called upon all of the Item Store's 200 contents. Alternatively, the If the Item Store 200 discovers that some of the items that can potentially contribute to the query result have not been scanned, the scanning is side affected to provide for the inclusion of such contents into the result of the transaction.

As such, to control whether items should be checked inline or not, a new session level set option @@VIRUSCHECK-ONREAD is introduced. When such field is assigned a value of '0', then all read queries typically only consider rows with scanState="clean". Likewise, when assigned a value of '1', rows with scanState!="clean" are forcibly scanned during the query execution.

The predicate can then altered to account for:
WHERE
(lastVirusSignatureScanTS=@@VIRUSSIGNATURETS AND scanState="clean")
OR@@VIRUSCHECKONREAD=1 AND lastSignatureScan!=@@VIRUSSIGNATURETS ANDItemHasVirus (ItemId)=0))

A similar predicate can be evaluated on other persisted data in the store such as Extensions and Links. In this case, the functions ExtensionHasVirus( ) or LinkHasVirus( ) would be called.

In a further aspect of the subject invention, the scheduling component 230 can schedule infected Items for processing by the AV Plug In CleanItem API. Such calls can return synchronously, and the AV metadata can be updated in the Item Store 200 based on the Boolean result of this call. For example, if the interface returns a value of "TRUE", the object has been cleaned. Then, the AV status for the row can be updated to lastVirusSignatureScanTS=@@VIRUSSIGNATURETS, and the value for scanState="clean". On the other hand, if the interface returns FALSE, the object could typically not be cleaned, and the AV status for the row is updated to lastVirusSignatureScanTS=@@VIRUSSIGNATURETS, and a value for scanState="infected"

Figure 3:
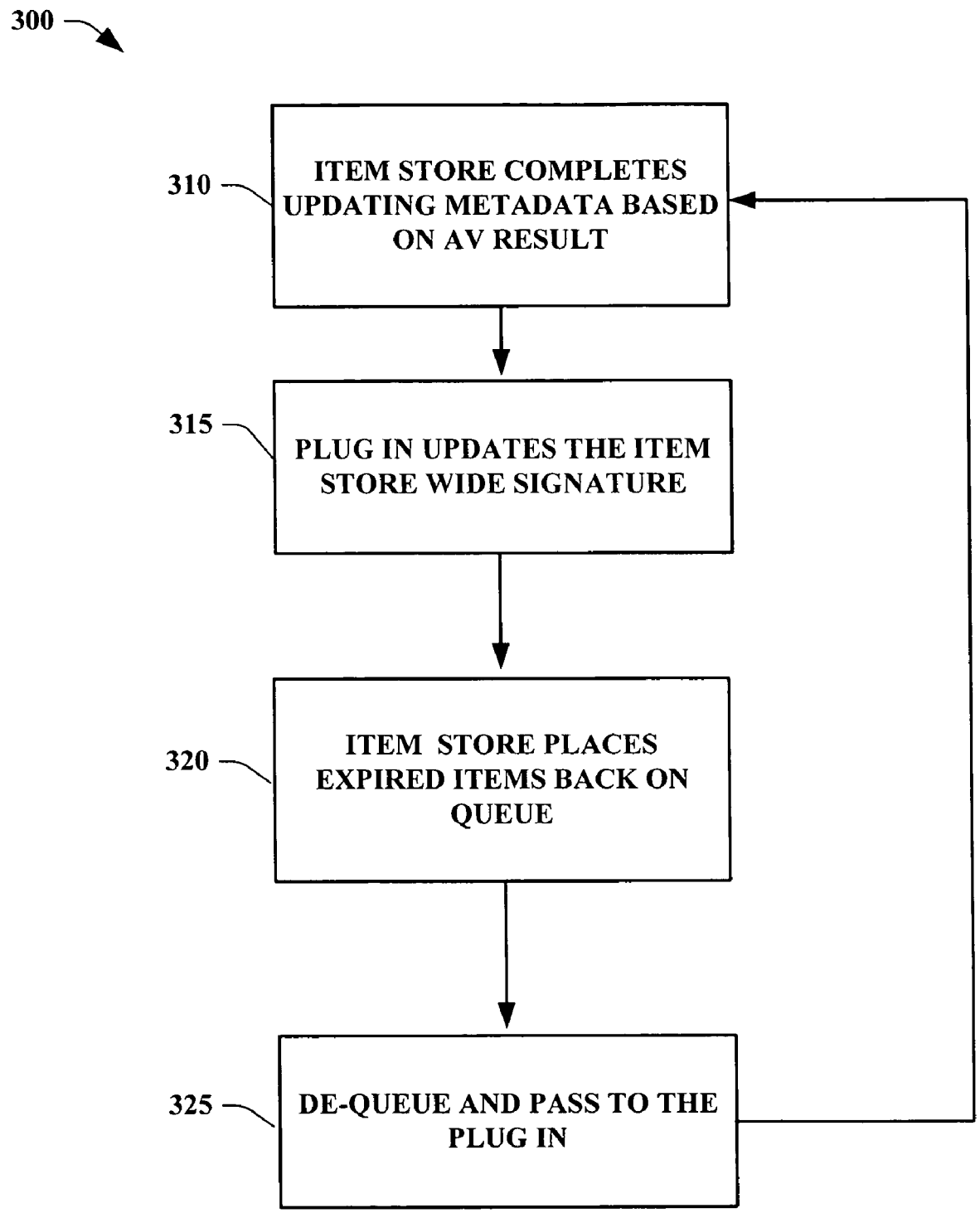
FIG. 3 illustrates a methodology for a back ground scanning in accordance with an aspect of the subject invention.

FIG. 3 illustrates a methodology 300 for a back ground scanning according to one aspect of the subject invention. Initially at 310 the Item Store completes an update of the metadata component based on results of an AV Plug In on the contents of the Item Store. Next and 315, the store wide signature of the Item Store is updated to reflect the recent AV Plug In scan. Next, the Item Store can place expired items back on the queue at 320, for a subsequent AV scan. In addition recent updates can also be waiting on such priority queue. As explained in detail Supra, Items in a queue can be de-queued by the Item Store and an appropriate AV interface can be called synchronously at 325. The methodology then loop back to step 310, when the Item Store completes an update of the metadata component based on results of an AV Plug In. While the exemplary method is illustrated and described herein as a series of blocks representative of various events and/or acts, the subject invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject invention. Moreover, it will be appreciated that the exemplary method and other methods according to the invention may be implemented in association with the method illustrated and described herein, as well as in association with other systems and apparatus not illustrated or described.

Referring now to FIG. 4a-4e, rows associated with the tables of the Item Store are illustrated, which include two columns to define two properties namely; "Last Virus Signature Scan", and a "Scan State". In general, a core operational feature of the relational data store is the ability to perform associative queries over tables. Sets of entities stored in tables can be accessed using a set processing language (e.g., SQL (Structured Query Language)). The language specifies one or more tables as the source of the data and outputs only those row(s), if any, that satisfy a given condition. For example, and as explained supra, the Item Store can be a relational database, an object database and/or an object relational database.

With respect to relational databases, a set of entities with the same structure is called a table and each entity is called a row. The components of the structure are called columns. A relational database can include one or a plurality of tables. An exemplary table signature update provided in FIGS. 4a-4e can undergo a virus scan in accordance with an aspect of the subject invention. It is to be appreciated that a data store of the subject invention contemplates existence of data in a form of both conventional data streams, as well as relational objects. Content of such table, needs to be from virus attack, e.g., when query result depend thereupon. In particular, when malicious codes can make use of encoded strings deposited in the store, which can get decoded in client space and propagated through e-mail. For example a virus can store an encrypted body "X" in the property of an item, such that it can propagates itself by querying the store and decoding the encrypted property on the client. In executing a query, the data store of the subject invention can employ a queuing mechanism for a queuing of items in the table in a synchronous and/or asynchronous mode for both scanning and cleaning by an antivirus Plug In supplied by vendors. Thereafter, the relational Item Store engine can provide a response to the query information based on the query and, significantly, the user context information.

FIG. 4a depicts a creation of a row, wherein the system automatically sets lastVirusSignatureScanTS=0 and scanState="suspect". The row can maintain such values until the AV Plug In has scanned the row, after which it will contain the timestamp of the scan plus the result of the scan, as illustrated in FIG. 4b by a "clean" status. FIG. 4c illustrates an update for the row, wherein the Item Store is automatically sets scanState="suspect", but does not change the value for lastVirusSignatureScanTS. The Anti Virus Plug In is responsible for scanning Item, Link or Extension rows and indicating that either the Item is virus free or infected. FIG. 4d illustrates a clean state wherein the Item Store sets lastVirusSignatureScanTS to the current value of @@VIRUSSIGNATURETS and the scanState property to "clean". Like wise, FIG. 4e illustrates the alternative scenario wherein the Item is infected. As such, the Item Store sets lastVirusSignatureScanTS to @@VIRUSSIGNATURETS, with the scanState property to "infected", which can cause a "quarantining" of the Item. Accordingly, such item needs to be sanitized by the Plug In before its content can be made available again for future queries.

Figure 5:
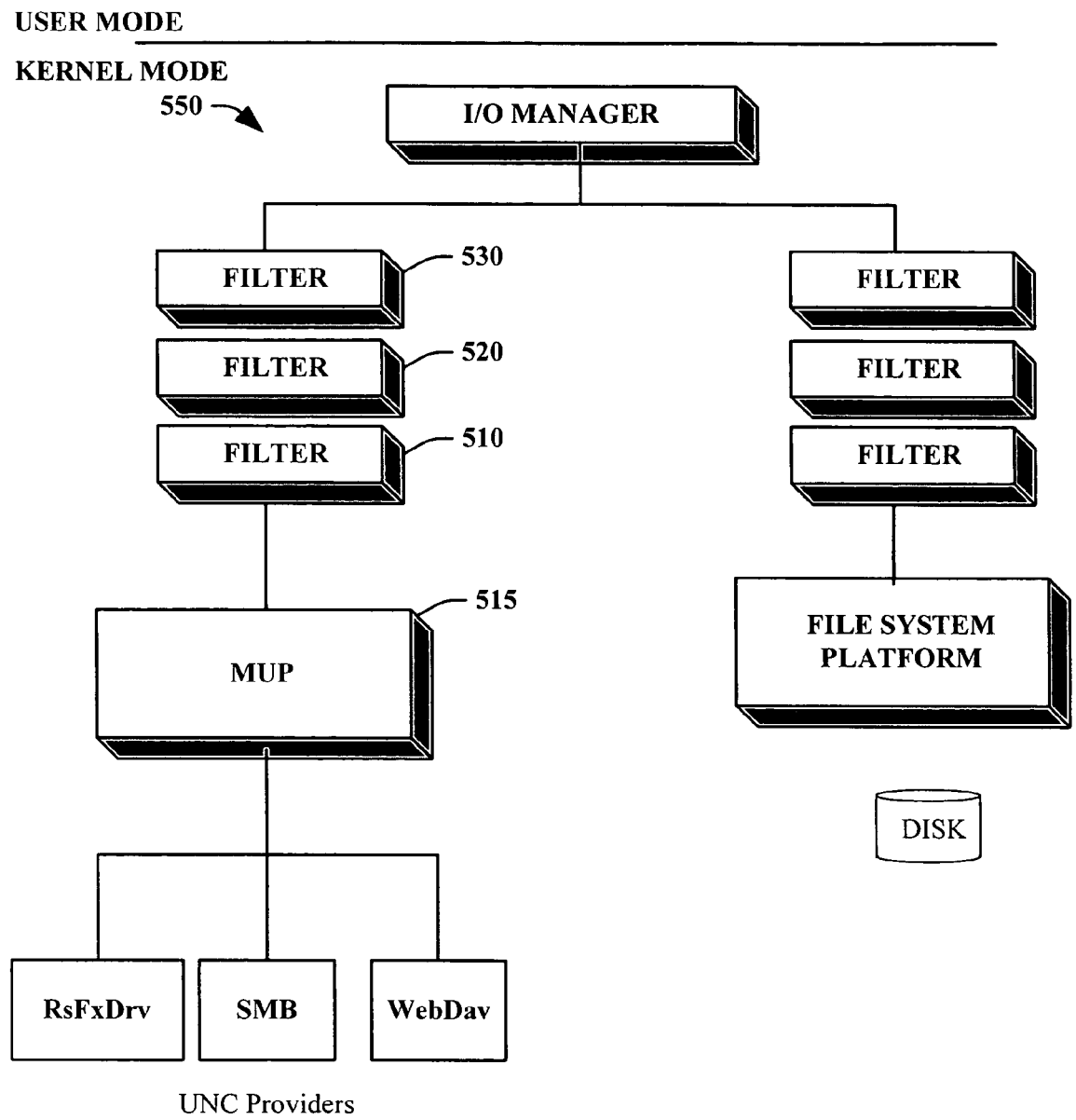
FIG. 5 illustrates a layering arrangement of filters for a particular system architecture in accordance with an aspect of the subject invention.

FIG. 5 illustrates a block diagram of a particular layering arrangement according to one aspect of the subject invention. Typically, the Item Store of the subject invention contemplates existence of data in a form of both conventional data streams, as well as relational objects. Accordingly, and to provide backward compatibility of the Item Store and its AV Plug Ins with traditional files (e.g., data stream files and applications), the subject invention employs a new architecture for filter files, wherein Multiple Universal Naming Convention Provider (MUP) component 515 registers as a file system and the UNC providers typically do not. In general, it can be assured that all the UNC I/O will typically pass through MUP. Accordingly, and as illustrated in FIG. 5, the stack of file filters, for example AV filter and the like, (510, 520, 530) can attach themselves to MUP (for example, layer themselves over MUP) and filter all UNC I/O, which includes the file stream I/O of items in the Item Store. The Universal Naming Convention (UNC) can supply a naming convention for files that provides a machine-independent means for locating the file. The MUP component 515 functions as a file system for UNC namespace access, wherein the same name space of directories and filenames visible to the Item Store is also visible to the AV Plug In.

As illustrated, the Kernel mode 550 can function as the nucleus or core of the computer operating system. Such operating system is generally responsible for processing data and managing input and output. The Kernel mode 550, as part of the operating system, is loaded first and remains in main memory. In addition to being responsible for process management, file management, and memory management, inter alia, the Kernel component 550 typically provides the essential services or procedures required by applications and drivers. For example, procedures can correspond to I/O scheduling, buffering, spooling, error handling, and the like. Furthermore, it should be noted that the term Kernel-mode 550 service as used herein is intended to cover any service, procedure, driver, application or other component that can be located in the Kernel address space.

In a related aspect of the subject invention, a set of interfaces can be provided as part of the interaction of the AV Plug In supplied by vendors and the relational Item Store engine. Such interfaces can for example be in a form of a series of stubs and/or place holders for routines that can be developed by the vendors to link the supplied AV Plug In with the relational Item Store. Such interfaces can be implemented by vendors for scanning and cleaning Items, Extensions and Links. For example:

BOOL ScanItem (ItemId itemId)

BOOL ScanExtension (ItemId itemId, ExtensionId extId)

BOOL ScanLink (ItemId itemId, LinkId linkId)

Each interface can return a Boolean state value. Such value can be set to "true" if the item is found to contain a virus (or participate in a piecemeal attack), and set to "false" if the item is virus free. Similarly examples for the cleaning procedure can include:

BOOL CleanItem (ItemId itemId)
    BOOL CleanExtension (ItemId itemId, ExtensionId extId)
    BOOL CleanLink (ItemId itemId, LinkId linkId)

Each interface can return a Boolean state value that can be set to "True" if the store object was successfully cleaned, and set to "False" if the AV Plug In could not clean the store object. Such functions can be called by the Item Store when an AV scan operation is needed for a store object, or when an AV clean operation is needed for an infected store object. In both cases, typically it is the AV vendor's responsibility to fetch Item data from the Store as needed using the Store mechanisms described supra. It is further appreciated that the scanning and cleaning aspects can be performed in conjunction or in separate stages. The interfaces can be called on demand by the Item Store for both synchronous and asynchronous scan and clean. In addition, typically all of the Item Store contents are accessible to the AV Plug In by employing standard query mechanisms with a privileged connection. In addition, installation of fake AV Plug Ins can be avoided for example, via employing a signed assembly. Each of the interfaces can also support a "void *" Plug In context to pass through in each API.

Figure 6:
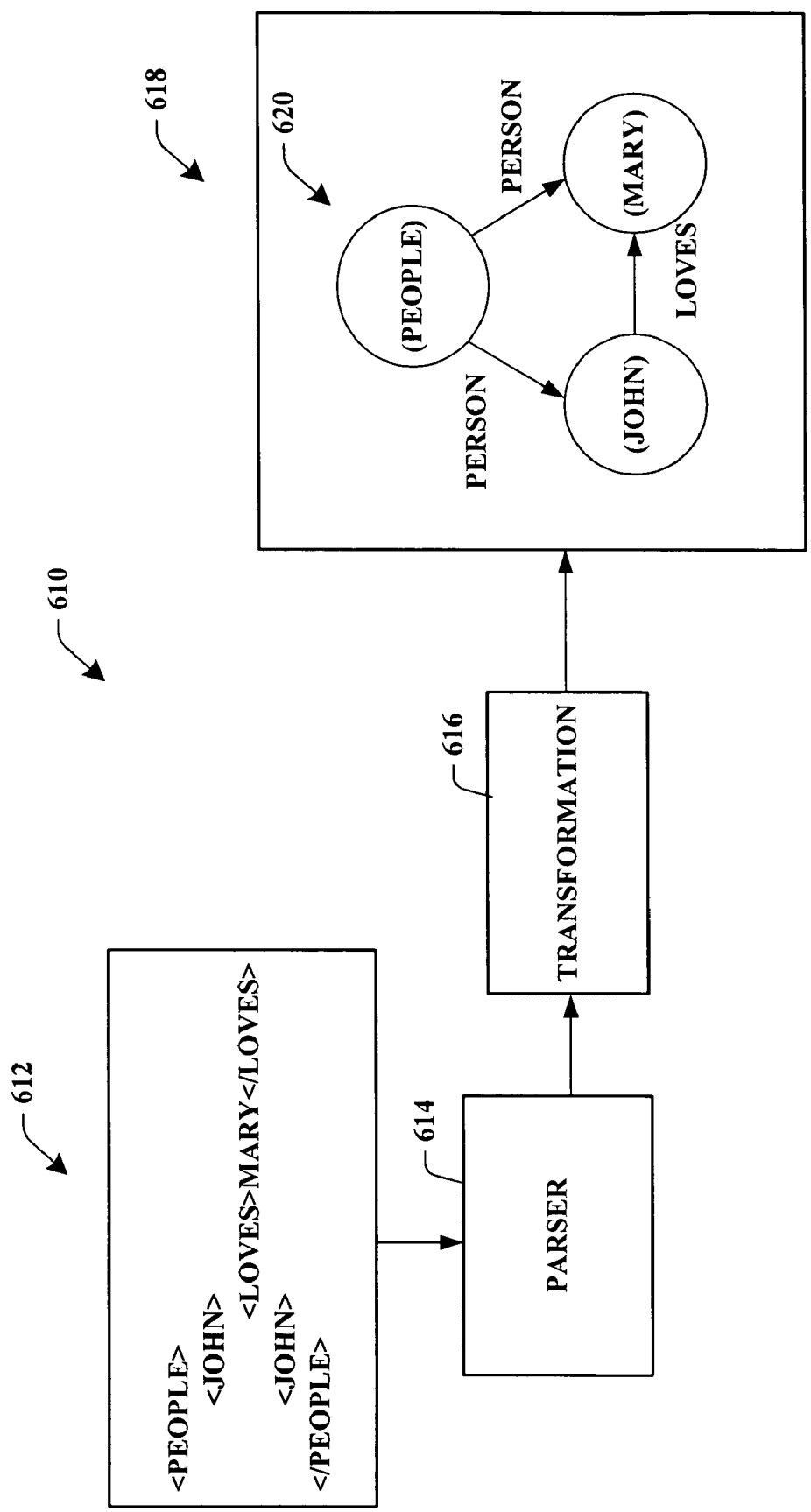
FIG. 6 illustrates a brief exemplary description of a system for transforming documents to a data structure residing in a memory of the Item Store, in accordance with an aspect of the subject invention.

FIG. 6 illustrates a brief exemplary description of a system 610 for transforming an XML document 612 to a data structure 620 residing in a memory of an Item Store conforming to a Document Object Model 618, according to one aspect of the subject invention. The XML document 612 is parsed by a parser 614 to provide a list of semantic elements and attributes to a transformation component 616. The list of semantic elements and attributes can then be transformed or mapped to the data structure 620 of the Item Store conforming to the Document Object Model 618. As illustrated in the XML document 612, the document includes a number of elements with parent child links. The data elements as represented in XML DOM would include a hierarchical structure with "People" as a top node and a first leaf or branch of the element "John" having sub nodes "Loves" and "Mary" and a second leaf or branch with the node "Mary". A parser that is selected to retrieve or match information from the second branch would retrieve the element "Mary" without any knowledge of the link that "John Loves Mary". However, the Item Store of the subject invention can model represent structures in terms of links between elements or items, therefore, the link that "John Loves Mary" is easily discernable from the present model. As can be seen in the data structure 620, a parser can retrieve information with respect to "Mary" by following the link between the "People" node to the "Mary" node to determine that Mary is a person and follow the link between the "Mary" node and the "John" node to determine that Mary is loved by John. Therefore, the present model presents data structure in terms of links, and in addition to in terms of elements (or items) and attributes as is the case in XML DOM.

Figure 7:
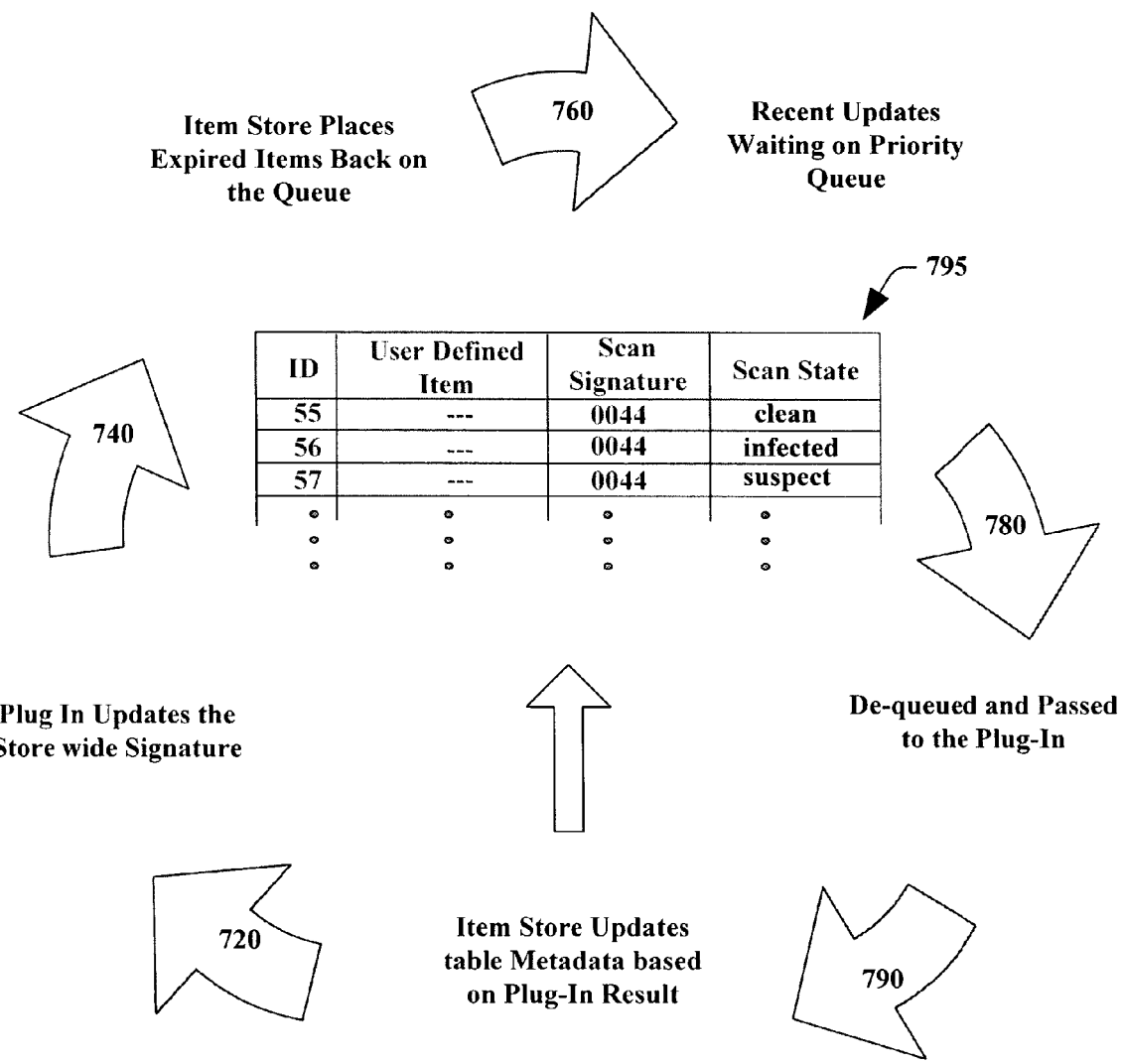
FIG. 7 illustrates a cycle for background scan queue of data in an Item Store according to one aspect of the subject invention.

FIG. 7 illustrates a cycle for back ground scan queue operation in accordance with an aspect of the subject invention. The cycle initially starts when the Item Store completes an update of the metadata component based on results of an AV Plug In on the contents of the Item Store. Next and moving clockwise by arrow 720, the store wide signature of the Item Store is updated to reflect the recent AV Plug In scan. Moving next by arrow 740, the Item Store can place expired items back on the queue, for a subsequent AV scan. In addition recent updates can also be waiting on such priority queue following the arrow 760. Items in a queue can be de-queued by the Item Store and an appropriate AV interface can be called synchronously as depicted by arrow 780. The scan cycle can then loop back as illustrated by arrow 790, when the Item Store completes an update of the metadata component based on results of an AV Plug In. As explained earlier, the meta data component can also supply a signature value assigned to the Item Store, which can represent the time of scanning of data, with space designated (e.g., designated columns) in the relational Item Store to identify the out come of such scanning (e.g., clean outcome, suspect outcome, infected out come, unnecessary to scan, and the like). Such is illustrated as chart 795. As such, pending scans can be provided as part of a life cycle for an item.

Figure 8:
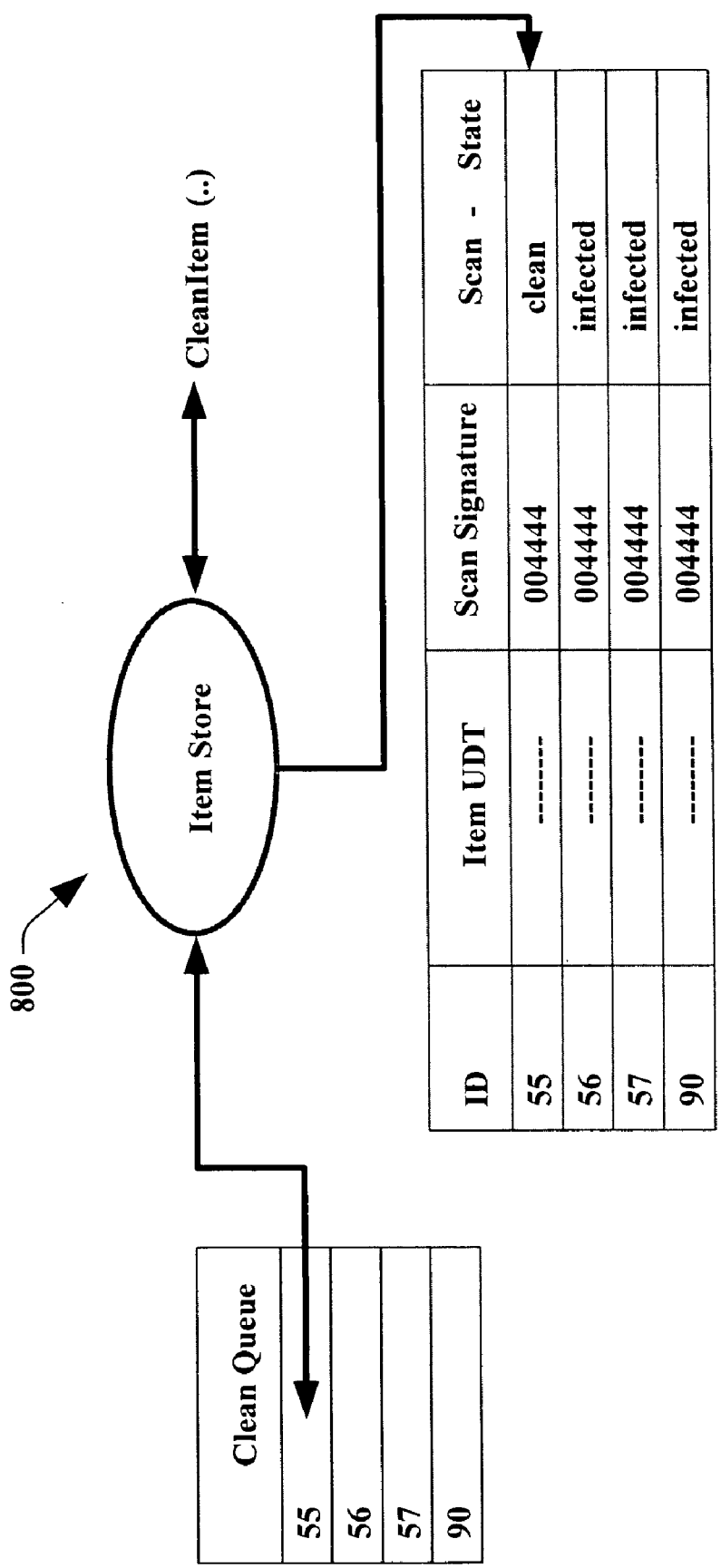
FIG. 8 illustrates a background clean queue of data in an Item Store in accordance with an aspect of the subject invention.

The Anti Virus Plug In is responsible for scanning Item, Link or Extension rows and indicating that either the Item is virus free or infected. To clean an infected item, and as illustrated in FIG. 8, the infected item can be scheduled for processing by the AV Plug In CleanItem API. Such call can be returned synchronously, and the AV metadata can be updated in the Item Store 800. If the call succeeds (for example, if the interface returns a value of "true"), the object can be deemed cleaned, and so indicated in the associated row.

Figure 9:
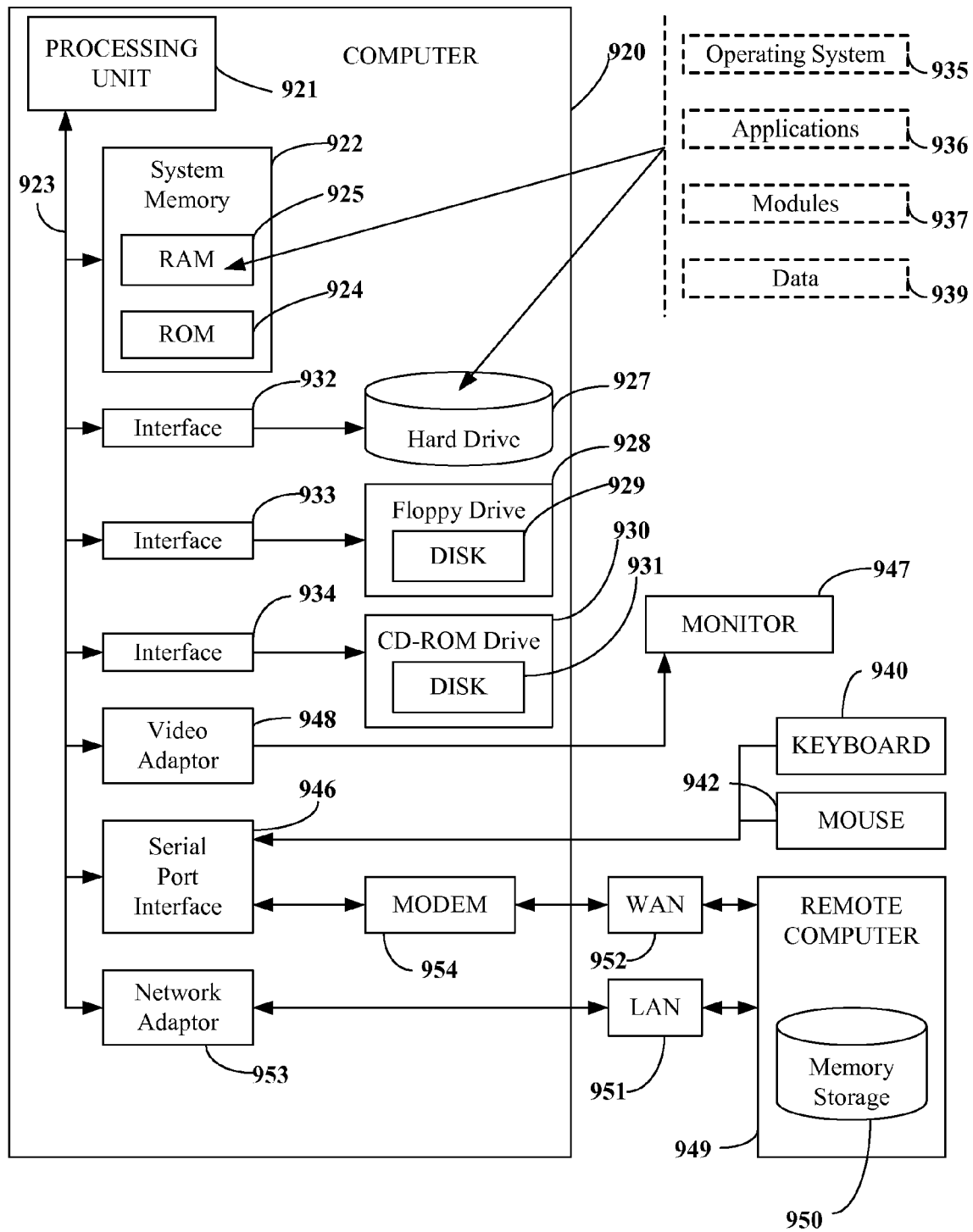
FIG. 9 is a schematic block diagram illustrating a suitable computing environment that can employ various aspects of the subject invention.

Referring now to FIG. 9, a brief, general description of a suitable computing environment on the client as well as the server side is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 920, including a processing unit 921, a system memory 922, and a system bus 923 that couples various system components including the system memory to the processing unit 921. The processing unit 921 can be any of various commercially available processors. Dual microprocessors and other multi-processor architectures also can be used as the processing unit 921.

The system bus can be any of several types of bus structure including a memory bus or memory controller, a peripheral bus, and a local bus using any of a variety of commercially available bus architectures. The system memory may include read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading from or writing to a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 925, including an operating system 935, one or more application programs 936, other program modules 939, and program data 939. The operating system 935 in the illustrated computer can be substantially any commercially available operating system.

A user can enter commands and information into the computer 920 through a keyboard 940 and a pointing device, such as a mouse 942. Other input devices (not shown) can include a microphone, a joystick, a game pad, a satellite dish, a scanner, or the like. These and other input devices are often connected to the processing unit 921 through a serial port interface 946 that is coupled to the system bus, but may be connected by other interfaces, such as a parallel port, a game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 can operate in a networked environment using logical connections to one or more remote computers, such as a remote computer 949. The remote computer 949 may be a workstation, a server computer, a router, a peer device or other common network node, and typically includes many or all of the elements described relative to the computer 920, although only a memory storage device 950 is illustrated in FIG. 9. The logical connections depicted in FIG. 9 may include a local area network (LAN) 951 and a wide area network (WAN) 952. Such networking environments are commonplace in offices, enterprise-wide computer networks, Intranets and the Internet.

When employed in a LAN networking environment, the computer 920 can be connected to the local network 951 through a network interface or adapter 953. When utilized in a WAN networking environment, the computer 920 generally can include a modem 954, and/or is connected to a communications server on the LAN, and/or has other means for establishing communications over the wide area network 952, such as the Internet. The modem 954, which can be internal or external, can be connected to the system bus 923 via the serial port interface 946. In a networked environment, program modules depicted relative to the computer 920, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 920, unless otherwise indicated. Such acts and operations are sometimes referred to as being computer-executed. It will be appreciated that the acts and symbolically represented operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 928, and CD-ROM 931) to thereby reconfigure or otherwise alter the computer system's operation, as well as other processing of signals. The memory locations wherein such data bits are maintained are physical locations that have particular electrical, magnetic, or optical properties corresponding to the data bits.

Figure 10:
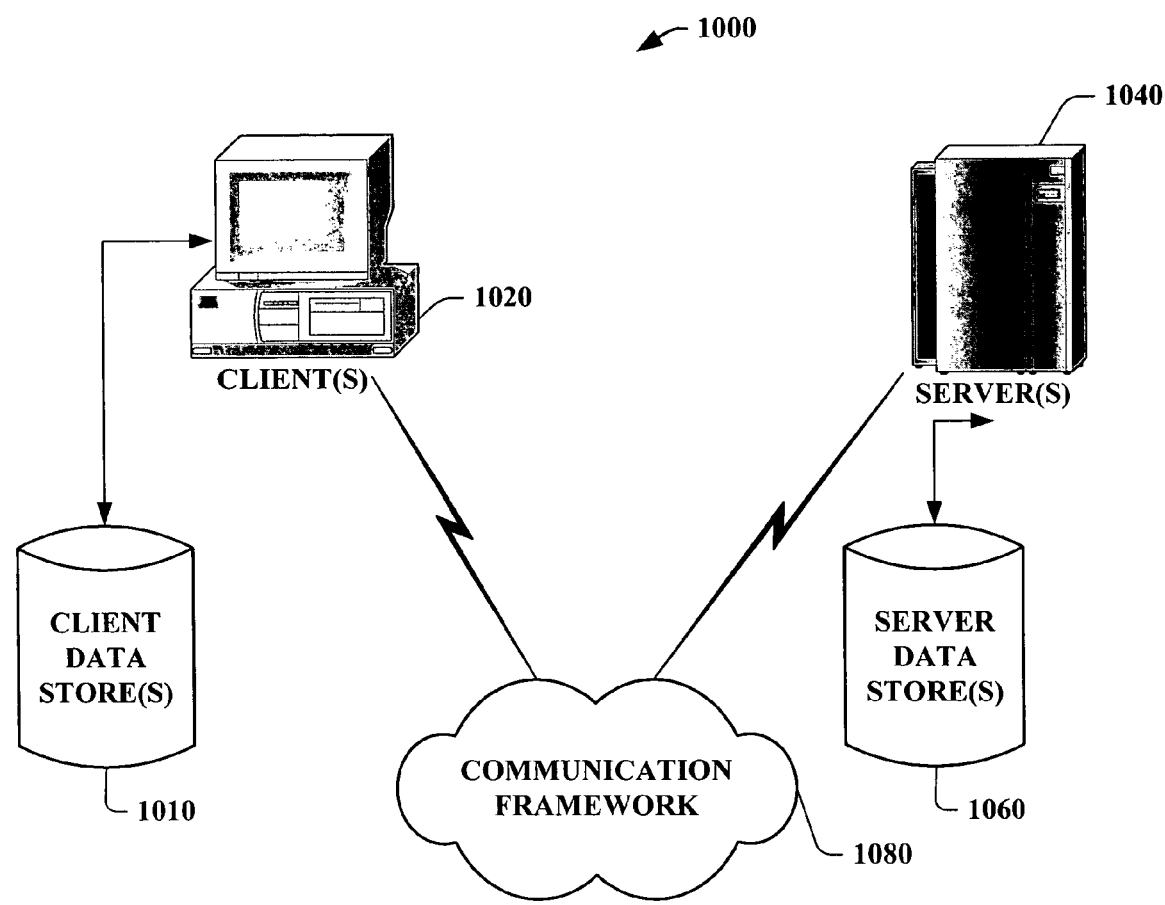
FIG. 10 illustrates a client-server system that can employ an anti virus scan methodology according to one aspect of the subject invention.

Referring now to FIG. 10, a client—server system 1000 that employs an AV Plug In methodology according to one aspect of the subject invention is illustrated. The client(s) 1020 can be hardware and/or software (e.g., threads, processes, computing devices). The system 1000 also includes one or more server(s) 1040. The server(s) 1040 can also be hardware and/or software (e.g., threads, processes, computing devices). For example, such servers 1040 can house threads to perform transformations by employing the subject invention. The client 1020 and the server 1040 can communicate, in the form of data packets transmitted according to the subject invention, between two or more computer processes. The client/server can also share the same process. As illustrated, the system 1000 includes a communication framework 1080 that can facilitate communications between the client(s) 1020 and the server(s) 1040. The client(s) 1020 is operationally connected to one or more client data store(s) 1010 that can store information local to the client(s) 1020.

Moreover, client 1020 can access and update databases 1060 located on a server computer 1040 running a server process. In one aspect of the subject invention, the communication frame work 1080 can be the internet, with the client process being a Web browser and the server process being a Web server. As such, a typical client 1020 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1040 can be university or corporate mainframe computers, or dedicated workstations, and the like.

It is to be appreciated that even though the subject invention has primarily been described in the context of an AV Plug In scoped to one store, a work flow can be implemented for multiple stores. In general, for a deployment of multiple stores over different machines, an inconsistent level of assurance for Anti Virus across the multiple stores, can result. To mitigate such inconsistency, a particular exemplary approach is to enable the Plug In for the client's Store to scan content that is being read from a Share on another Store. This can typically require the Anti Virus characteristics of the originating store to be included in the serialized form of the Item that is being consumed by the client application. Based on this information and on local policy, the Plug In available to the client's store can scan content that is being read from the source store. More particularly, such Anti Virus Plug is scoped to one Store. Therefore if an application running on a different machine reads content from the Item Store through a Share, the application is protected by the Anti Virus Plug In on the Store that is hosting the Share. In a deployment of multiple stores over different machines, this leads to an inconsistent level of assurance for Anti Virus across multiple stores. One solution is to allow the Plug In for the client's Store to scan content that is being read from a Share on another Store. This would require the Anti Virus characteristics of the originating store to be included in the serialized form of the Item that is being consumed by the client application. Based on this information and on local policy, the Plug In available to the client's store may scan content that is being read from the source store.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer-readable storage medium having stored thereon computer-executable components of a relational Item Store, the relational Item Store comprising:
   data arranged in a relational database that includes tables, the relational Item Store configured to execute an associative query over the tables, each table including one or more rows, each row having an individually associated virus-scan state for the row that indicates whether the row is clean;
   a metadata component that supplies semantics for operation of an anti virus Plug In(s) that parses through the relational Item Store, the semantics including:
     a first predicate adjustable among a plurality of states, including a first state and a second state;
     the first predicate being configured to, when the first predicate is in the first state and in response to the relational Item Store executing the associative query over the tables of the relational database, cause data in rows having an associated virus-scan state other than clean to be excluded from the result of the associative query;
     the first predicate being configured to, when the first predicate is in the second state and in response to the relational Item Store executing the associative query over the tables of the relational database:
       cause the relational Item Store to identify one or more rows subject to the associative query having an associated virus-scan state other than clean;
       cause the anti virus Plug In to virus scan each identified row; and
       after the anti virus Plug In virus scans each identified row, cause the query to include, in the result of the associative query, data in rows having an associated virus-scan state that is clean; and
   a scanning component that queues contents of the Item Store to the anti virus Plug In for a virus scan thereof according to the supplied semantics.

2. The Item Store of claim 1, the metadata component supplies a signature value that represents a time of scanning of the contents.

3. The Item Store of claim 1, the metadata component supplies a scan state for the contents of the relational item store.

4. The Item Store of claim 3, the scan state is set to at least one of suspect, clean or infected.

5. The Item Store of claim 3, the scan state is set to unnecessary to scan.

6. The Item Store of claim 1, the scanning component queues the contents in at least one of a synchronous or asynchronous manner.

7. The Item Store of claim 1 further comprising a parser to parse through data structure of the Item Store to determine links of text to elements.

8. The Item Store of claim 1, the metadata component supplies a signature value to the Item Store.

9. The Item Store of claim 8, the signature value represents time of scanning contents of the Item Store.

10. The Item Store of claim 1, the scanning component comprises at least one of an asynchronous queuing component or a synchronous queuing component.

11. The Item Store of claim 1, further comprising a scheduling component that schedules scan processes for the Plug In.

12. A method for scanning an Item Store comprising:
   defining data arranged in a relational database that includes tables in the Item Store, the Item Store configured to execute an associative query over the tables, each table including one or more rows, each row having an individually associated virus-scan state for the row that indicates whether the row is clean;

supplying semantics for operation of an anti virus Plug In via the Item Store, the semantics including:

a first predicate adjustable among a plurality of states, including a first state and a second state;

the first predicate being configured to, when the first predicate is in the first state and in response to the Item Store executing the associative query over the tables of the relational database, cause data in rows having an associated virus-scan state other than clean to be excluded from the result of the associative query;

the first predicate being configured to, when the first predicate is in the second state and in response to the Item Store executing the associative query over the tables of the relational database:

cause the Item Store to identify one or more rows subject to the associative query having an associated virus-scan state other than clean;

cause the anti virus Plug In to virus scan each identified row; and after the anti virus Plug In virus scans each identified row, cause the query to include, in the result of the associative query, data in rows having an associated virus-scan state that is clean; and scanning the contents of the Item Store according to the supplied semantics.

13. The method of claim 12 further comprising supplying a signature value to the Item Store, the signature value designates a scan time.

14. The method of claim 12 further comprising supplying a scan state status to scanned contents.

15. The method of claim 12 further comprising queuing contents for a scan.

16. The method of claim 15 further comprising de-queuing contents from the scan.

17. The method of claim 12, the scanning act comprises scanning in a synchronous manner.

18. The method of claim 12, the scanning act comprises scanning in an asynchronous manner.

19. The method of claim 12 further comprising automatically en-queuing modified contents of the Item Store for scanning.

20. The method of claim 12 further comprising automatically en-queuing new contents of the Item Store for scanning.

21. The method of claim 17 further comprising performing a forced scan.

22. The method of claim 12 further comprising side affecting scan of contents in response to a query directed to the Item Store.

23. The method of claim 22 further comprising cleaning an infected content.

24. A computer readable medium having stored thereon computer executable instructions for carrying out the method of claim 12.

25. A computer-readable storage medium having stored thereon computer-executable components of an Item Store, the Item Store comprising:

data arranged in a relational database that includes tables, the Item Store configured to execute an associative query over the tables, each table including one or more rows, each row having an individually associated virus-scan state for the row that indicates whether the row is clean;

a metadata component that supplies semantics for operation of an anti virus Plug In(s) on virus portions distributed across multiple items in the Item Store, the semantics including:

a first predicate adjustable among a plurality of states, including a first state and a second state;

the first predicate being configured to, when the first predicate is in the first state and in response to the Item Store executing the associative query over the tables of the relational database, cause data in rows having an associated virus-scan state other than clean to be excluded from the result of the associative query;

the first predicate being configured to, when the first predicate is in the second state and in response to the Item Store executing the associative query over the tables of the relational database:

cause the Item Store to identify one or more rows subject to the associative query having an associated virus-scan state other than clean;

cause the anti virus Plug In to virus scan each identified row; and after the anti virus Plug In virus scans each identified row, cause the query to include, in the result of the associative query, data in rows having an associated virus-scan state that is clean;

a scan component that queues contents of the Item Store to the anti virus Plug In for a virus scan thereof according to the supplied semantics; and a set of stubs that facilitate interaction of the anti virus Plug In with the Item Store.

26. A computer-readable storage medium having stored thereon computer-executable components of an Item Store, the item store comprising:

means for arranging data in a relational database that includes tables, the Item Store configured to execute an associative query over the tables, each table including one or more rows, each row having an individually associated virus-scan state for the row that indicates whether the row is clean;

means for supplying semantics for operating an anti virus Plug In(s) on a divided virus with portions distributed across multiple items of the Item Store, the semantics including:

a first predicate adjustable among a plurality of states, including a first state and a second state;

the first predicate being configured to, when the first predicate is in the first state and in response to the relational Item Store executing the associative query over the tables of the relational database, cause data in rows having an associated virus-scan state other than clean to be excluded from the result of the associative query;

the first predicate being configured to when the first predicate is in the second state and in response to the relational Item Store executing the associative query over the tables of the relational database:

cause the relational Item Store to identify one or more rows subject to the associative query having an associated virus-scan state other than clean;

cause the anti virus Plug In to virus scan each identified row; and after the anti virus Plug In virus scans each identified row, cause the query to include, in the result of the associative query, data in rows having an associated virus-scan state that is clean; and means for queuing contents of the Item Store to the anti virus Plug In for a virus scan thereof according to the supplied semantics.

27. The Item Store of claim 26, further comprising means for cleaning infected items.

28. The Item Store of claim 26, further comprising means for providing the A V Plug In a same visibility to contents as a file system of the Item Store.

* * * * *

UNITED STATES PATENT AND TRADEMARK OFFICE
CERTIFICATE OF CORRECTION

| | | |
|---|---|---|
| PATENT NO. | : 7,694,340 B2 | Page 1 of 1 |
| APPLICATION NO. | : 10/959383 | |
| DATED | : April 6, 2010 | |
| INVENTOR(S) | : Balan Sethu Raman et al. | |

It is certified that error appears in the above-identified patent and that said Letters Patent is hereby corrected as shown below:

In column 16, line 55, in Claim 26, delete "to when" and insert -- to, when --, therefor.

Signed and Sealed this
First Day of February, 2011

David J. Kappos
*Director of the United States Patent and Trademark Office*